July 21, 1970  J. VAN VELDHUIZEN  3,521,566
AMPHIBIOUS BOAT
Filed Oct. 27, 1967  5 Sheets-Sheet 1
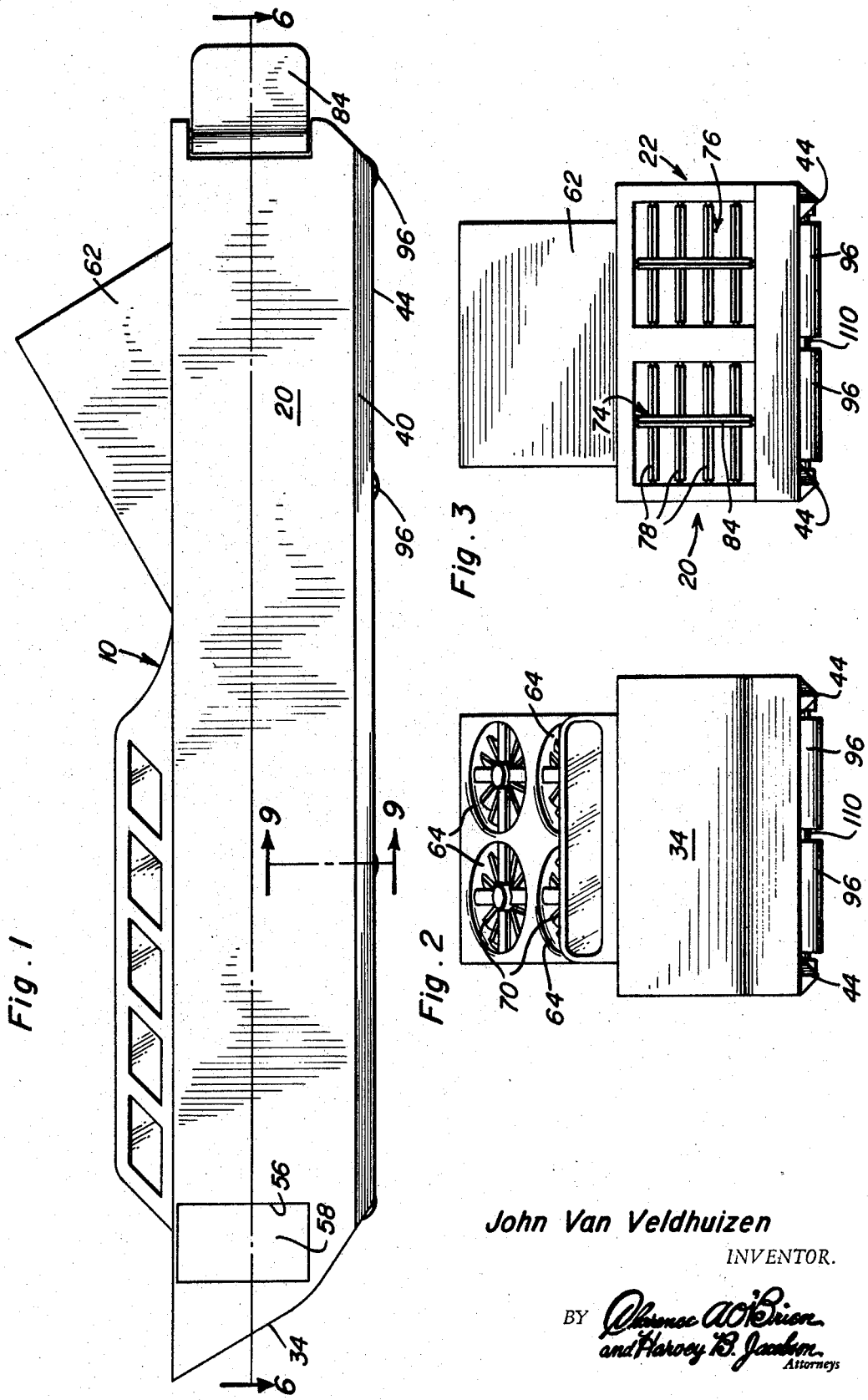
John Van Veldhuizen
INVENTOR.

July 21, 1970  J. VAN VELDHUIZEN  3,521,566
AMPHIBIOUS BOAT
Filed Oct. 27, 1967  5 Sheets-Sheet 2
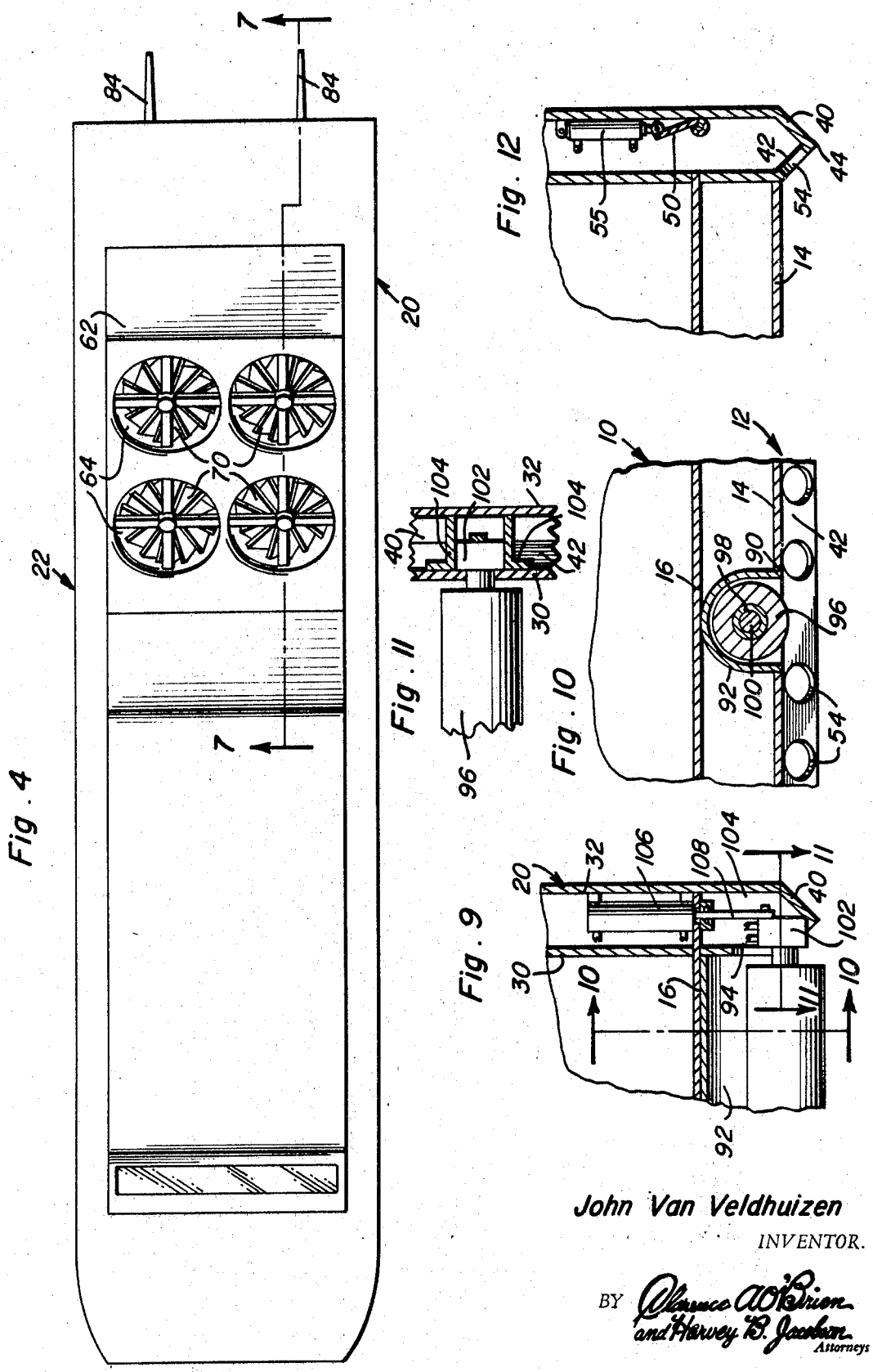
John Van Veldhuizen
INVENTOR.

July 21, 1970   J. VAN VELDHUIZEN   3,521,566
AMPHIBIOUS BOAT
Filed Oct. 27, 1967   5 Sheets-Sheet 3
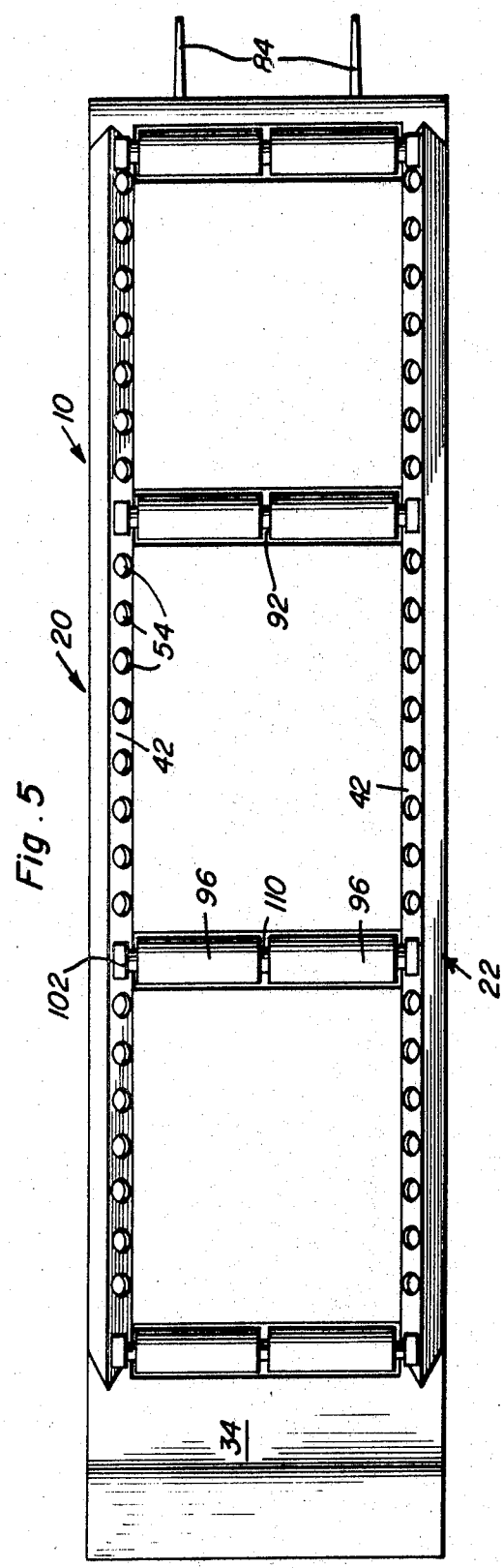
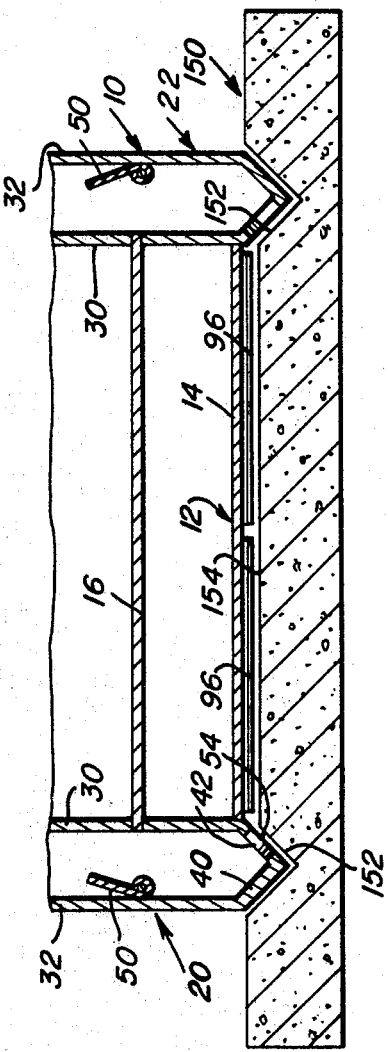
John Van Veldhuizen
INVENTOR.

July 21, 1970 — J. VAN VELDHUIZEN — 3,521,566

AMPHIBIOUS BOAT

Filed Oct. 27, 1967 — 5 Sheets-Sheet 4

John Van Veldhuizen
INVENTOR.

BY *Clarence A. O'Brien*
*and Harvey B. Jacobson*
Attorneys

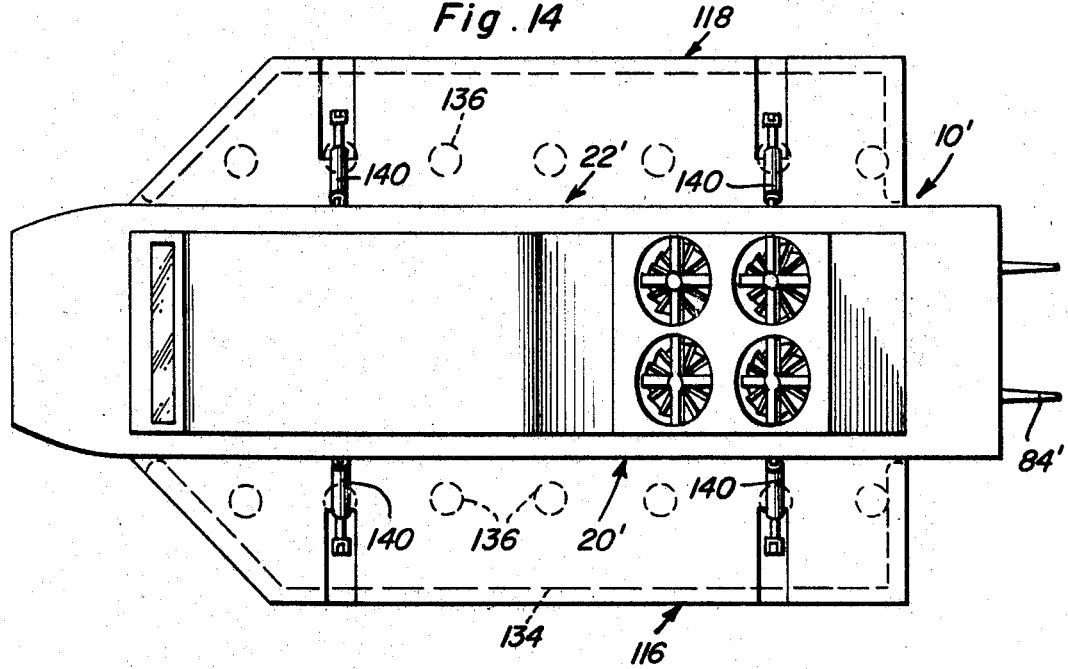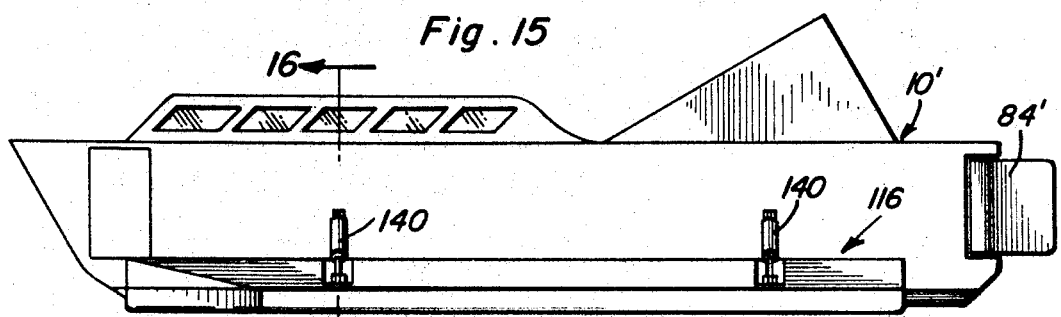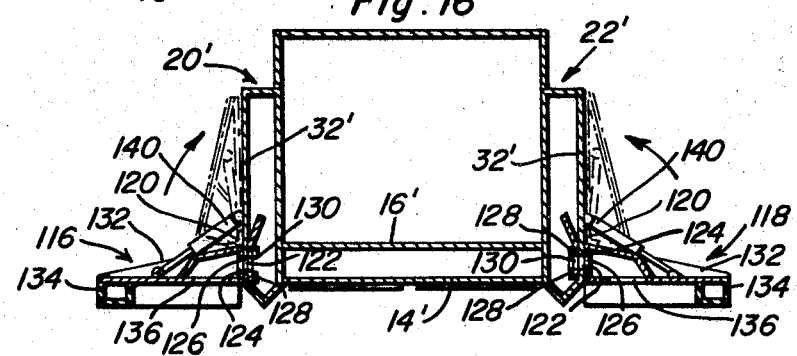

United States Patent Office 3,521,566
Patented July 21, 1970

1

3,521,566
AMPHIBIOUS BOAT
John Van Veldhuizen, 31601 SW. 197th Ave.,
Homestead, Fla. 33030
Filed Oct. 27, 1967, Ser. No. 678,630
Int. Cl. B60v 1/04, 3/04
U.S. Cl. 104—23                 19 Claims

ABSTRACT OF THE DISCLOSURE

An air propelled vehicle including means operative to discharge sufficient quantities of air downwardly about the periphery of the vehicle to support the vehicle from a generally horizontal surface such as land or water, the bottom of said vehicle also being contoured to coact with the areas of downward discharge of air to enable the vehicle to automatically guide itself along a prepared bed.

---

Figure 6:
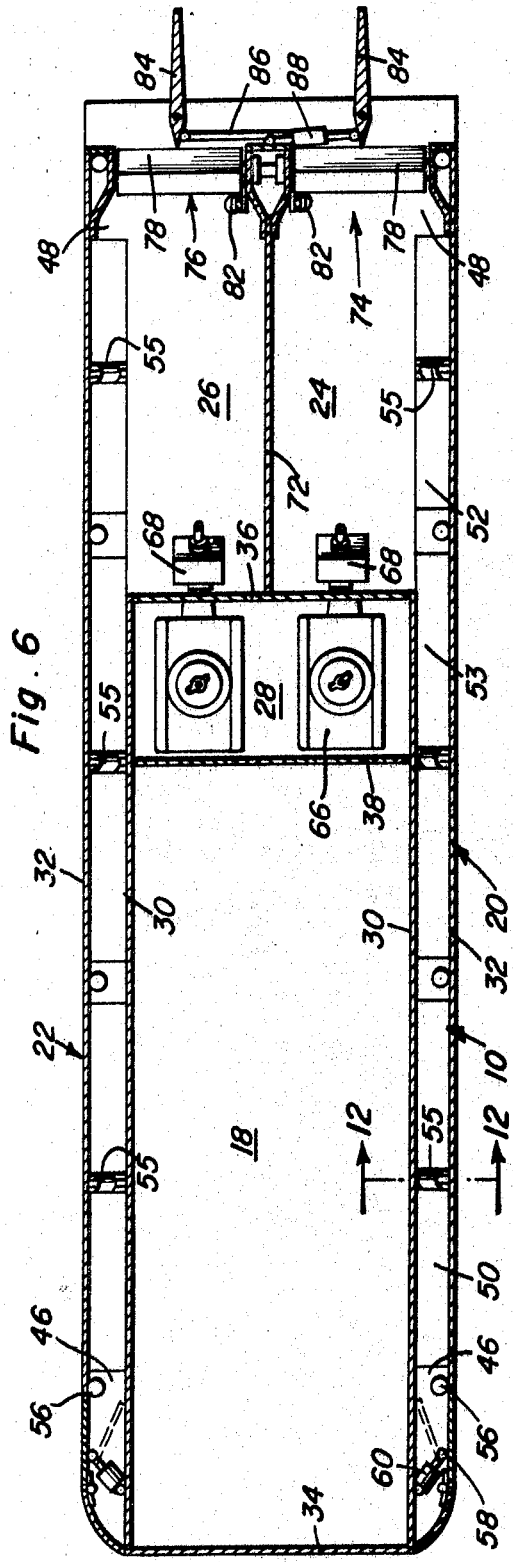

The vehicle of the instant invention is constructed in the form of a boat and includes structure which is buoyant and which will therefore enable the vehicle to float on a body of water without power. Of course, the vehicle includes bottom surfaces also adapted to rest stationarily upon the ground and the vehicle is therefore adapted for use as a fully amphibious vehicle. Further, the vehicle may be propelled by air when on land and when on water and therefore the operator of the vehicle only needs to follow one set of procedures for controlling the vehicle whether the vehicle be operating on land or on water.

The vehicle includes means for discharging large quantities of air under pressure downwardly along zones extending along peripheral portions of the vehicle in a manner to buoy up the vehicle and raise it at least several inches above a supporting surface. In addition, the vehicle further includes means for directing large quantities of air rearwardly of the vehicle in order to propel the vehicle forwardly and rudder means is provided whereby the rearwardly directed air may be laterally deflected in order to steer the vehicle. In addition, the vehicle also incldes means for discharging air laterally of the forward portion of the vehicle and means for substantially completely blocking the rearward discharge of air from the vehicle.

The main object of this invention is to provide a fully amphibious vehicle operative to support itself by air being discharged downwardly from peripheral portions of the vehicle and to be propelled as well as steered by the horizontal discharge of air under pressure.

Another object of this invention, in accordance with the immediately preceding object, is to provide a vehicle adapted to be automatically guided along an elongated bed of predetermined configuration.

Still another object of this invention is to provide a vehicle including horizontally outwardly projecting opposite side supplemental support structures including outer peripheral skirt portions and means adapted to discharge air downwardly therefrom with the downwardly directed air maintained at least partially captive by the skirt means thereof so as to provide additional lift portions for said vehicle, said outwardly projecting support means being supported from said vehicle for upward swinging movement of the outer peripheral edge portions of the support means toward retracted upstanding positions adjacent opposite sides of the vehicle.

2

Still another object of this invention is to provide a vehicle including air discharge means operative to support the vehicle at least slightly elevated above a horizontal surface and to propel and steer the vehicle over a supporting surface.

Another object of this invention is to provide a vehicle in accordance with the preceding object and including means by which the steering and propelling air being discharged may be substantially eliminated in order that the vehicle may hover motionless above its supporting surface.

A final object of this invention to be specifically enumerated herein is to provide a vehicle which may conform to conventional forms of manufacture, be of simple construction and easy to operate so as to provide a device that will be economically feasible, and operable by many persons.

Figure 7:
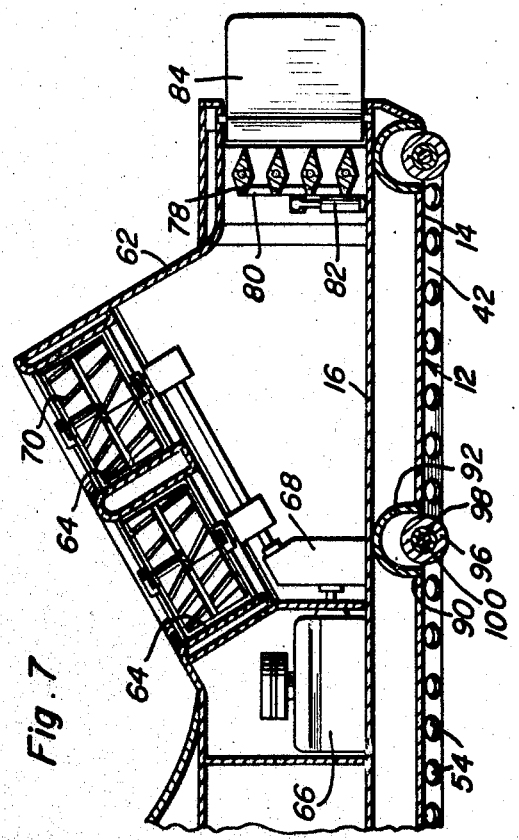
Figure 8:
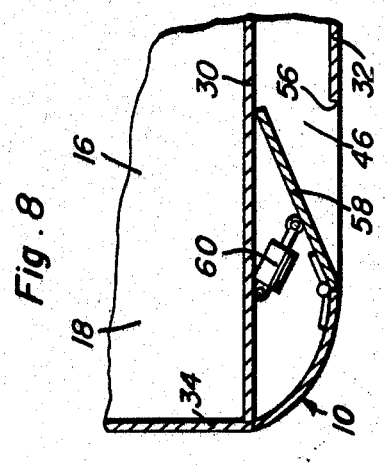

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevational view of the vehicle;
FIG. 2 is a front elevational view of the vehicle;
FIG. 3 is a rear elevational view of the vehicle;
FIG. 4 is a top plan view of the vehicle;
FIG. 5 is a bottom plan view of the vehicle;
FIG. 6 is a horizontal sectional view taken substantially upon the plane indicated by section line 6—6 of FIG. 1;
FIG. 7 is a fragmentary longitudinal vertical sectional view taken substantially upon a plane indicated by section line 7—7 of FIG. 4;
FIG. 8 is a fragmentary horizontal sectional view comprising an enlargement of the lower left hand portion of FIG. 6 and with the control flap in a different position of operation;
FIG. 9 is a fragmentary enlarged transverse vertical sectional view taken substantially upon a plane indicated by section line 9—9 of FIG. 1;
FIG. 10 is a fragmentary vertical sectional view taken substantially upon a plane indicated by section line 10—10 of FIG. 9;
FIG. 11 is a fragmentary horizontal sectional view taken substantially upon a plane indicated by section line 11—11 of FIG. 9;
FIG. 12 is an enlarged fragmentary transverse vertical sectional view taken substantially upon a plane indicated by section line 12—12 of FIG. 6;
FIG. 13 is a fragmentary transverse vertical sectional view of the vehicle on somewhat of an enlarged scale and illustrating the manner in which the air discharge ports or openings for the air to be downwardly discharged are arranged in relation to the transverse contour of the bottom of the vehicle in a manner such that the vehicle may be automatically guided along a prescribed bed having a transverse configuration conforming to the transverse configuration of the vehicle adjacent its bottom;
FIG. 14 is a top plan view of a modified form of vehicle;
FIG. 15 is a side elevational view of the modified form of vehicle illustrated in FIG. 14;
FIG. 16 is a transverse vertical sectional view taken substantially upon a plane indicated by section line 16—16 of FIG. 15; and FIG. 17 is a fragmentary transverse vertical sectional view illustrating a modified form of resilient depending skirt utilized on the embodiment of FIGS. 14–16.

Referring now more specifically to the drawings the numeral 10 generally designates the amphibious boat which comprises an improvement over the boat disclosed in my prior U.S. Pats. Nos. 3,259,097, dated July 5, 1966 and 3,332,389 dated July 25, 1967.

The boat 10 includes an air-tight bottom assembly generally referred to by the reference numeral 12 including a bottom member 14 and a false bottom 16 in vertically spaced relation above the bottom member 14. The boat 10 includes a forward compartment 18 disposed between its opposite side assemblies generally referred to by the reference numerals 20 and 22 above the bottom assembly 12 and which may be in the form of an operator and passenger compartment. A pair of opposite side rear compartments 24 and 26 are also defined between the side assemblies 20 and 22 above the bottom member 12 and an intermediate engine compartment 28 is defined intermediate the forward compartment 18 and the rear compartments 24 and 26 above the bottom assembly 12.

The side assemblies 20 and 22 include upstanding inner and outer walls 30 and 32 and it may be seen that the inner walls 30 extend rearwardly from the upwardly inclined bow forming forward end portion 34 of the bottom member 14 to the rearmost extremity of the engine compartment 28 at which point the inner walls 30 are interconnected by means of a transverse upstanding partition 36 extending therebetween. Further, a second partition 38 extends between the inner walls 30 and defines the forward extremity of the engine compartment 28.

The area between each pair of inner and outer walls 30 and 32 defines longitudinally extending air passages which open rearwardly into the corresponding rear compartments. The lower ends of the outer walls 32 terminate downwardly in inwardly and downwardly inclined portions 40 and the lower marginal edge portion of the inner walls 30 terminate downwardly in downwardly and outwardly inclined portions 42, the portions 40 and 42 projecting below the bottom member 14, so as to define a pair of longitudinally extending downwardly projecting generally V-shaped runners 44.

The false bottom 16 includes forward opposite side lateral extensions 46 extending between the inner and outer walls 30 and 32 at each side of the boat 10 and rear lateral extensions 48 extending outwardly to the outer walls 32. The areas between the inner and outer walls 30 and 32 intermediate corresponding extensions 46 and 48 include vertically swingable front, rear and intermediate flap members 50, 52 and 53 each actuatable by an associated fluid cylinder 55 and swingable between the horizontal positions thereof illustrated in FIG. 6 of the drawings and positions with their free edge portions swung upwardly from those positions illustrated in FIGS. 12 and 13.

The portions 42 include a plurality of longitudinally spaced air discharge apertures 54 and the forward extremities of the outer walls 32 discharge openings 56 formed therein with which hinged closure flaps 58 actuated by fluid cylinders 60 are operatively associated for movement between the closed positions illustrated in solid lines in FIG. 6 and the open positions such as that illustrated in FIG. 8.

With attention now invited more specifically to FIGS. 6 and 7 of the drawings it may be seen that the rear compartments 24 and 26 include a forwardly and upwardly inclined air inlet shroud structure defining four separate air inlet openings 64. The engine compartment 28 houses a pair of prime movers 66 and a pair of angle drive gear assemblies 68 are disposed within the rear compartments 24 and 26. The prime movers 66 are drivingly coupled to the gear assemblies 68 through the partition 36. A rotary high pressure fan assembly 70 is disposed in each air inlet opening 64 and the fan assemblies 70 on each side of the boat 10 are driven from the corresponding gear assembly 68. Accordingly, operation of the prime movers 66 will cause large quantities of air to be drawn into the shroud 62 and to be pumped downwardly into the rear compartments 24 and 26 separated by means of a longitudinal partition 72. Rear compartments 24 and 26 are open at their rear ends and selectively closeable at their rear ends by means of shutter assemblies generally referred to by the reference numerals 74 and 76 each including a plurality of vertically spaced shutter elements 78 mounted for oscillation about horizontal transverse axes and interconnected by means of an actuating rod 80 to which a fluid motor 82 is connected. In addition, the boat 10 includes a plurality of upstanding rudder members 84 disposed immediately rearwardly of the rear open ends of the compartments 24 and 26 and are mounted for oscillation about vertical axes, the rudder members 84 being suitably interconnected for simultaneous oscillation by means of a connecting rod 86 and being oscillatable by a fluid motor 88 operatively connected to one of the rudder members 84.

The bottom member 14 includes four transversely extending and longitudinally spaced openings 90 formed therein in which downwardly opening and generally semi-cylindrical partitions 92 are secured. The portions of the partitions 92 spaced farthest from the bottom member 14 are also suitably connected to the false bottom 16 in any convenient manner and the inner walls 30 are provided with vertically extending slots 94 in registry with the downwardly opening areas defined by the partitions 92.

In each of the downwardly opening areas defined by one of the partitions 92 a pair of rollers 96 are disposed. The rollers 96 are axially spaced and aligned and include inner sleeve portions 98 journalled on a support shaft 100 extending therethrough. The sleeve portions 98 include remote end portions which are slidably received through and rotatably journalled in the corresponding slots 94 and which comprise output shaft portions of hydraulic motors 102 mounted for vertical sliding movement between L-shaped brace members 104 secured to the corresponding inner walls 30. The hydraulic or fluid motors 102 are each prevented from rotation by the L-shaped bracket or brace members 104 and are vertically shiftable by means of fluid motors or cylinders 106 supported from the outer walls 32 and including piston rod portions 108 operatively engaged with the fluid motors 102.

The adjacent ends of each pair of aligned transversely spaced rollers 96 are maintained in spaced apart relation by means of a sleeve-type spacer 110 mounted on the corresponding shaft 100 and disposed between the adjacent ends of the corresponding sleeve portion 98. Accordingly, it may be seen that the fluid motors 102 may be selectively actuated by any suitable controls by which their communication with a suitable source of hydraulic fluid under pressure is controlled. The rollers 98 may be selectively or simultaneously driven in either direction or braked and may be vertically shifted between the lowered position thereof illustrated in FIG. 7 and the raised position thereof illustrated in FIG. 10 of the drawings.

With attention now invited more specifically to FIGS. 14–16 of the drawings there may be seen a boat generally referred to by the reference numeral 10' and which is substantially identical to the boat 10 except that it is provided with opposite side hingedly supported bottom extension assemblies generally referred to by the reference numerals 116 and 118. The extension assemblies 116 and 118 are hingedly supported from the side assemblies 20' and 22' corresponding to the assemblies 20 and 22 by means of hinge assemblies 120 and are swingable between the solid line position thereof illustrated in FIGS. 14–16 and the phantom line position thereof illustrated in FIG. 16. The boat 10' includes structural features thereof which are identical to corresponding features of the boat 10 and which are designated by corresponding primed numerals. The outer walls 32' include a plurality of longitudinally spaced openings 122 in general horizontal registry with the space defined between the bottom member 14' and the false bottom 16' and the extension assemblies 116 and 118 include wall portions 124 having openings 126 swingable into registry with the openings 122 when the extension 116 and 118 in their lowered generally horizontal positions illustrated in FIGS. 14–16.

Further, the outer walls 32' include vertically spaced and longitudinally extending guides 128 from which closure plates 130 are slidably supported for shifting longitudinally of the boat 10' and the closure plates 130 have openings therein registrable with the openings 122 and 126 whereby the communication between the interiors of the side assemblies 20' and 22' and the hollow upper portions 132 of the extensions 116 and 118 may be selectively initiated and terminated, as desired. The closure plates 130 may be actuated in any suitable manner such as manually or by means of fluid cylinders (not shown).

The extensions 116 and 118 include peripheral skirt portions 134 and it may be seen from FIG. 16 of the drawings that the skirt portions 134 are tubular in configuration and constructed of resilient material. Further, it may be seen from FIGS. 14 and 16 of the drawings that each of the extensions 116 and 118 includes a plurality of longitudinally spaced openings 136 which open downwardly from the interior of the extensions 116 and 118. Accordingly, when the extensions 116 and 118 are swung from their stored upstanding phantom line positions illustrated in FIG. 16 of the drawings to the horizontally disposed operative positions by means of the fluid motors 140 operatively connected between the extensions 116 and 118 and the corresponding side assemblies 20' and 22', the hollow upper portions of the extensions 116 and 118 may be communicated with the interiors of the side assemblies 20' and 22' by properly shifting the closure plates 130 so as to allow pressurized air to pass from the interior of the side assemblies 20' and 22' into the extensions 116 and 118 and downwardly and outwardly through the openings 136. Of course, the skirt portions 134 prevent free escape of the air discharged downwardly from the opening 126.

With attention now invited more specifically to FIG. 17 of the drawings there may be seen a modified form of skirt portion referred to by the reference numeral 134' and which is substantially identical to the tubular skirt portion 134 but which is generally semi-cylindrical in cross-sectional shape as opposed to rectangular. Further, a plurality of openings 142 are provided and communicates the interior of the skirt portions 134' with the corresponding hollow portion of the associated extension. Of course, openings similar to openings 142 may also be provided for communicating the hollow portion of the extensions 116 and 118 with the interior of the skirt portions 134.

In operation, operation of the prime mover 66 will cause large quantities of air to be drawn into the rear chambers 24 and 26 and to be exhausted rearwardly from the rear ends of the chambers 24 and 26 between the shutter elements 78 so as to propel the boat 10 forwardly. Of course, the rudder members 84 may be actuated to steer the boat 10 and a portion of the pressurized air in the rear chambers 24 and 26 will flow forwardly into the hollow portions of the side assemblies 20 and 22 between the inner and the outer walls 30 and 32 thereof above the flap members 50, 52 and 53. If the flap members 50, 52 and 53 are open, air from the upper portion of the side assemblies 20 and 22 may pass downwardly into the lower portions of the side assemblies 20 and 22 and exit through the apertures 54 so as to form a lifting cushion of pressurized air beneath the bottom member 14. If it is desired, the rollers 96 may be in their upper retracted positions to reduce water drag opposing forward movement of the boat 10. However, if it is desired to divide the cushion of pressurized air beneath the hole into individual cushions of pressurized air, the rollers 96 may be lowered. Of course, some air will move between the adjacent ends of each pair of rollers 96, but this transfer of air is negligible.

If it is desired to steer the bow end of the boat laterally or to propel the boat 10 in reverse, the flap 58 may be selectively or simultaneously opened and the shutter elements 78 may be closed. Of course, with the shutter elements closed and the flaps 58 closed the boat 10 will hover above the water.

The prime movers 66 may also be drivingly connected to any suitable fluid pumps (not shown) for supplying fluid under pressure to the various fluid cylinders and motors and if it is desired to move the boat 10 while on to a beach and over the land, the rollers 96 are lowered and each roller 96 may be caused to rotate in either direction by its associated fluid motor 102. Of course, the boat 10 may be propelled solely by air being discharged from its rear end and steered on land by means of the rudders 84 or by braking the rollers 96 on one side of the boat 10 and driving the rollers 96 on the other side of the boat 10.

The modified form of boat 10' illustrated in FIGS. 14–16 is provided when heavy loads are to be lifted and the extension assemblies 116 and 118 provide at least a fifty percent increase in the loading lifting capacity of the boat 10 by the formation of a larger cushion of pressurized air beneath the boat 10'. Otherwise, the operation of the boat 10' is substantially identical to the operation of the boat 10.

With reference now more specifically to FIG. 13 of the drawings, there may be seen an elongated road or track bed referred to in general by the reference numeral 150 and which has a pair of parallel upwardly opening V-shaped grooves 152 formed therein and a slightly downwardly recessed central surface 154. The grooves 152 and the recessed central surface 154 conform exactly in configuration to the configuration of the bottom of the boat 10 and the boat 10 is operative to move longitudinally along the bed 150 by entrapping an air cushion between the confronting surfaces of the bottom of the boat 10 and the bed 150 in order to lift the boat 10 slightly above the bed 150. Of course, the rollers 96 are maintained in their retracted position and the boat 10 may be propelled along the bed 150 by air being discharged rearwardly from the rear ends of the chambers 24 and 26 between the shutter elements 78.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An air propelled boat including an elongated bottom section, a pair of upstanding side assemblies projecting upwardly from opposite side marginal edge portions of said bottom section, and rearwardly opening chamber means defined between the rear end portions of said side assemblies above said bottom section, means defining air inlet means for said chamber means, air pump means operative to pump large quantities of air into said chamber means under pressure, said upstanding side assemblies defining air passage means extending longitudinally of said boat, the rear end portions of said air passage means opening into opposite sides of said chamber means and said air passage means terminating at their forward ends in the forward end portions of said side assemblies, said side assemblies including laterally opening outlet openings formed therein opening into the forward ends of said air passage means, first control flap means operatively associated with said outlet openings for selectively varying and terminating the discharge of air under pressure therethrough, and second control flap means operatively associated with the rear open end of said chamber means for selectively varying and terminating the discharge of air under pressure therefrom.

2. The combination of claim 1 wherein said side assemblies each include hollow lower portions projecting slightly below said bottom section, communicated with said chamber means, and including inwardly opening outlets, and control means operable to selectively vary and terminate communication of said hollow lower portions with said chamber means.

3. The combination of claim 1 wherein said side assemblies each include a hollow generally panel-like extension assembly each of said panel assemblies being pivotally secured along one marginal edge portion to the lower marginal portion of the corresponding side assembly for swinging movement between an operative generally horizontally disposed position projecting outwardly from the corresponding side assembly and an inoperative upstanding position with its free swinging edge portion swung upwardly, said extension assemblies including a plurality of air outlet openings in the wall portions thereof disposed lowermost when said extension assemblies are in the operative positions, said side and extension assemblies including means operative to communicate said chamber means and air passage means with the interiors of said extension assemblies when the latter are in their operative positions.

4. The combination of claim 3 wherein at least the edge portions of said assemblies remote from said one marginal edge portion thereof include means defining depending skirt portions projecting below said lowermost wall portions when said extensions are in their operative positions.

5. The combination of claim 4 wherein said means operative to communicate said chamber means and air passage means with the interiors of said extension assemblies include control means operative to selectively vary and terminate such communication.

6. The combination of claim 1 wherein said bottom section is hollow and buoyant, said boat being sufficiently buoyant, independent of said chamber means and said air passage means, to float said boat with the water line disposed below the open rear end of said chamber means.

7. The combination of claim 1 wherein said air inlet means opens upwardly from the forward end portion of said chamber means.

8. The combination of claim 1 wherein said side assemblies each include hollow lower portions projecting slightly below said bottom section, communicated with said chamber means, and including inwardly opening outlets, and control means operable to selectively vary and terminate communication of said hollow lower portions with said chamber means, said side assemblies each including a hollow generally panel-like extension assembly, each of said panel assemblies being pivotally secured along one marginal edge portion to the lower marginal portion of the corresponding side assembly for swinging movement between an operative generally horizontally disposed position projecting outwardly from the corresponding side assembly and an inoperative upstanding position with its free swinging edge portion swung upwardly, said extension assemblies including a plurality of air outlet openings in the wall portions thereof disposed lowermost when said extension assemblies are in the operative positions, said side and extension assemblies including means operative to communicate said chamber means with the interiors of said extension assemblies when the latter are in their operative positions.

9. The combination of claim 8 wherein at least the edge portions of said assemblies remote from said one marginal edge portion thereof include means defining depending skirt portions projecting below said lowermost wall portions when said extensions are in their operative positions.

10. The combination of claim 9 wherein said means operative to communicate said chamber means with the interior of said extension assemblies include control means operative to selectively vary and terminate such communication.

11. The combination of claim 1 including an elongated guide bed provided with a generally planar upper surface having a pair of parallel grooves formed therein of cross-sectional shape complementary to the cross-sectional shape of said hollow lower portions of said side assemblies, said vehicle being disposable on said guide bed with the lower surfaces thereof substantially directly opposing the surfaces of said grooves and the upper surface of said guide bed disposed between said groove.

12. A vehicle including an elongated bottom section, a pair of upstanding side assemblies projecting upwardly from opposite side marginal edge portions of said bottom section and defining air passage means extending longitudinally of said vehicle, air pump means operative to pump large quantities of air into said air passage means under pressure, said side assemblies each including hollow lower portions projecting slightly below said bottom section, communicated with said air passage means, and including outlets opening inwardly beneath said bottom section, and control means operable to selectively vary and terminate communication of said hollow lower portions with said air passage means, and sets of closely axially spaced rollers journaled from said vehicle for rotation about horizontal transverse axes and extendible downwardly toward and retractable upwardly from positions with the lower peripheral portions of said rollers projecting at least slightly below said hollow lower portions, said sets of rollers extending between said hollow lower portions and being spaced apart longitudinally of said vehicle throughout substantially the entire length of said bottom section disposed between said hollow lower portions.

13. The combination of claim 12 wherein said side assemblies each include a hollow generally panel-like extension assembly, each of said panel assemblies being pivotally secured along one marginal edge portion to the lower marginal portion of the corresponding side assembly for swinging movement between an operative generally horizontally disposed position projecting outwardly from the corresponding side assembly and an inoperative upstanding position with its free swinging edge portion swung upwardly, said extension assemblies including a plurality of air outlet openings in the wall portions thereof disposed lowermost when said extension assemblies are in the operative positions, said side and extension assemblies including means operative to communicate said chamber air passage means with the interiors of said extension assemblies when the latter are in their operative positions.

14. The combination of claim 13 wherein at least the edge portions of said extension assemblies remote from said one marginal edge portion thereof include means defining depending skirt portions projecting below said lowermost wall portions when said extensions are in their operative positions.

15. The combination of claim 14 wherein said means operative to communicate said chamber air passage means with the interior of said extension assemblies include control means operative to selectively vary and terminate such communication.

16. The combination of claim 12 including control flap means operatively associated with the rear open end of said chamber means for selectively varying and terminating the discharge of air under pressure therefrom and comprising horizontally disposed and transversely extending elongated vertically spaced flap members supported for oscillation about vertically spaced axes generally paralleling said flap members.

17. The combination of claim 16 including upstanding rudder means mounted for oscillation about upstanding axes and disposed rearwardly of said control flap means, and means for adjustably oscillating said rudder means.

18. The combination of claim 12 wherein said roller means include independently rollable opposite side rollers, and drive means drivingly connected to each of said rollers for selective driving of the rollers on each side of said vehicle.

19. The combination of claim 18 wherein said drive means also includes means operative to selectively brake said rollers.

References Cited

UNITED STATES PATENTS

| | | | |
|---|---|---|---|
| 2,586,218 | 2/1952 | Gazda | 115—1 |
| 3,208,543 | 9/1965 | Crowley | 114—67 |
| 3,332,389 | 7/1967 | Van Veldhuizen et al. | 115—11 |

ANDREW H. FARRELL, Primary Examiner

U.S. Cl. X.R.

115—1, 11